US010880197B2

United States Patent
Naskar et al.

(10) Patent No.: US 10,880,197 B2
(45) Date of Patent: Dec. 29, 2020

(54) METHODS, SYSTEMS, AND COMPUTER READABLE MEDIA FOR TESTING A NETWORK NODE USING SOURCE CODE FOR PROGRAMMING A PACKET FORWARDING PLANE OF THE NETWORK NODE

(71) Applicant: Keysight Technologies, Inc., Santa Rosa, CA (US)

(72) Inventors: Rudrarup Naskar, Kolkota (IN); Prasenjit Ranjan Adhikary, Kolkata (IN); Kingshuk Mandal, Kolkata (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 162 days.

(21) Appl. No.: 16/035,534

(22) Filed: Jul. 13, 2018

(65) Prior Publication Data

US 2020/0021512 A1 Jan. 16, 2020

(51) Int. Cl.
*H04L 12/26* (2006.01)
*H04L 12/741* (2013.01)
*G06F 8/41* (2018.01)
*G06F 11/36* (2006.01)
*H04L 29/06* (2006.01)

(52) U.S. Cl.
CPC ........... *H04L 43/50* (2013.01); *G06F 8/41* (2013.01); *G06F 11/3684* (2013.01); *H04L 45/745* (2013.01); *H04L 69/22* (2013.01)

(58) Field of Classification Search
CPC ....... H04L 43/50; H04L 45/745; H04L 69/22; G06F 8/41; G06F 11/3684
See application file for complete search history.

(56) References Cited

U.S. PATENT DOCUMENTS 7,272,822 B1 9/2007 Riggins et al.
8,028,276 B1 9/2011 Bessonov
(Continued)

FOREIGN PATENT DOCUMENTS

CN 107749802 A 3/2018

OTHER PUBLICATIONS

Saha et al., "Fault Detection Effectiveness of Source Test Case Generation Strategies for Metamorphic Testing," MET, arXiv:1802.07361v1, pp. 1-8 (Feb. 20, 2018).
(Continued)

*Primary Examiner* — Ian N Moore
*Assistant Examiner* — Latresa A McCallum

(57) ABSTRACT

According to one method, the method occurs at a network equipment test device. The method includes receiving one or more source code files for programming a packet forwarding plane of a network node; analyzing the one or more source code files to determine test metadata, wherein analyzing the one or more source code files to determine the test metadata includes identifying source code portions that indicate conditions for rejecting or accepting packets and determining the test metadata based on the conditions; generating, using the test metadata, one or more test plans for testing the network node, wherein the one or more test plans define test packets to be sent to the network node for testing the network node's implementation of the conditions for rejecting or accepting packets; and testing the network node using the one or more test plans.

17 Claims, 8 Drawing Sheets

(56) References Cited

U.S. PATENT DOCUMENTS

| | | | |
|---|---|---|---|
| 9,891,898 B1 | 2/2018 | Tonsing | |
| 10,164,829 B1 | 12/2018 | Watson et al. | |
| 10,225,381 B1 | 3/2019 | Bosshart | |
| 10,581,491 B2 | 3/2020 | Won et al. | |
| 10,686,671 B1 | 6/2020 | Mozumdar et al. | |
| 10,733,088 B1 | 8/2020 | Sommers | |
| 2006/0168205 A1 | 7/2006 | Barron et al. | |
| 2006/0259629 A1 | 11/2006 | Usmani et al. | |
| 2009/0112505 A1 | 4/2009 | Engel et al. | |
| 2012/0033678 A1 | 2/2012 | Page et al. | |
| 2013/0152047 A1* | 6/2013 | Moorthi | G06F 11/368 717/124 |
| 2014/0157245 A1* | 6/2014 | Krueger | G06F 8/70 717/140 |
| 2015/0088827 A1 | 3/2015 | Xu et al. | |
| 2015/0172208 A1 | 6/2015 | DeCusatis et al. | |
| 2015/0234725 A1 | 8/2015 | Cillis et al. | |
| 2015/0365325 A1 | 12/2015 | Hwang et al. | |
| 2016/0234087 A1 | 8/2016 | Nyerges et al. | |
| 2017/0237632 A1 | 8/2017 | Hegde et al. | |
| 2017/0322873 A1 | 11/2017 | Morris | |
| 2018/0210823 A1 | 7/2018 | Vorganti | |
| 2018/0255027 A1 | 9/2018 | Winig et al. | |
| 2019/0014395 A1 | 1/2019 | Anand et al. | |
| 2019/0065349 A1 | 2/2019 | Sharma et al. | |
| 2019/0199654 A1 | 6/2019 | Pope et al. | |
| 2019/0222481 A1 | 7/2019 | Hira | |
| 2019/0260682 A1 | 8/2019 | Ewert | |
| 2019/0379588 A1 | 12/2019 | Rao | |

OTHER PUBLICATIONS

Nötzli, "p4pktgen: Automated Test Case Generation for P4 Programs," SOSR '18, pp. 1-7 (Mar. 28-29, 2018).

"Test Case Management for Improved QA," Perforce, pp. 1-13 (2018).

$P_4$ (programming language), Wikipedia, https://en.wikipedia.org/w/index.php?title=P4_(programming_language)&oldid=812348591, pp. 1-3 (Nov. 27, 2017).

"$P4_{16}$ Language Specification," The P4 Language Consortium, version 1.0.0, pp. 1-129 (May 22, 2017).

Commonly-assigned, co-pending U.S. Appl. No. 16/290,426, for "Methods, Systems, and Computer Readable Media for Testing a Network Node or a Related Application Programming Interface Using Source Code Metadata," (Unpublished, filed Mar. 1, 2019).

Commonly-assigned, co-pending U.S. Appl. No. 16/269,498 for "Methods, Systems, and Computer Readable Media for Providing Dynamically Configurable, Distributed Network Visibility Device," (Unpublished, filed Feb. 6, 2019).

"Sparkline," Wikipedia, https://en.wikipedia.org/wiki/Sparkline, pp. 1-3 (2019).

"The World's Fastest & Most Programmable Networks," Barefoot Networks, https://barefootnetworks.com/resources/worlds-fastest-most-programmable-networks/, pp. 1-10 (Feb. 6, 2019).

"P4Runtime Specification," The P4.org and API Working Group, Version 1.0.0, pp. 1-97 (Jan. 29, 2019).

"P4Runtime Specification," The P4.org API Working Group, Version 1.0.0-rc4, pp. 1-72 (Jan. 25, 2019).

"Cubro Sessionmaster EXA48600," Cubro Network Visibility, pp. 1-5 (2019).

Commonly-assigned, co-pending U.S. Appl. No. 16/181,309, for "Methods, Systems, and Computer Readable Media for Testing Network Elements of an In-Band Network Telemetry Capable Network," (Unpublished, filed Nov. 5, 2018).

Rodriguez et al., "BB-Gen: A Packet Crafter for P4 Target Evaluation", SIGCOMM Posters and Demos '18, pp. 1-3 (Aug. 20-25, 2018).

Anand et al., "POINT: An Intent-driven Framework for Integrated Packet-Optical In-band Network Telemetry," Infinera Corporation, pp. 1-6 (2018).

Liang et al., "In-band Network Function Telemetry," Tsinghua University, pp. 1-3 (Aug. 20-25, 2018).

Iša et al., "Verification of Generated RTL from P4 Source Code," 2018 IEEE 26th International Conference on Network Protocols, pp. 1-2 (2018).

"Cubro's network packet broker evolution," Cubro Blog, pp. 1-3 (Jan. 15, 2018).

McKeown et al., "P4 Runtime—Putting the Control Plane in Charge of the Forwarding Plane," The P4 Language Consortium, pp. 1-6 (Dec. 4, 2017).

Hyun et al., "Knowledge-Defined Networking using In-band Network Telemetry," Department of Computer Science and Engineering, POSTECH, pp. 1-4 (2017).

Van, Tu Nguyen et al., "Towards ONOS-based SDN Monitoring using In-band Network Telemetry," Department of Computer Science and Engineering, POSTECH, pp. 1-6 (2017).

Shahbaz et al., "PISCES: A Programmable, Protocol-Independent Software Switch," SIGCOMM'16, pp. 1-14 (Aug. 22-26, 2016).

Kim et al., "In-band Network Telemetry via Programmable Dataplanes," pp. 1-2 (2015).

Non-Final Office Action for U.S. Appl. No. 16/269,498 (dated Jan. 28, 2020).

Non-Final Office Action for U.S. Appl. No. 16/181,309 (dated Oct. 28, 2019).

Commonly-assigned, co-pending U.S. Appl. No. 16/446,318 for "Methods, Systems, and Computer Readable Media for Configuring a Test System Using Source Code of a Device Being Tested," (Unpublished, filed Jun. 19, 2019).

Zhang et al., "HyperVDP: High-Performance Virtualization of the Programmable Data Plane," IEEE Journal on Selected Areas in Communications, vol. 37, No. 3, pp. 556-569 (Mar. 2019).

"Dynamic Test-Based P4 Packet Blaster Hardware Configuration," IPCOM000257013D, pp. 1-6 (Jan. 10, 2019).

"p4lang / switch," https://github.com/p4lang/switch, pp. 1-4 (Copyright 2019).

Papneja et al., "Basic BGP Convergence Benchmarking Methodology for Data-Plane Convergence," RFC 7747, pp. 1-35 (Apr. 2016).

Ginoza, "Reques for Comments Summary RFC Nos. 2800-2899," RFC 2899, pp. 1-22 (May 2001).

Bradner et al., "Benchmarking Methodology for Network Interconnect Devices," RFC 2544, pp. 1-31 (Mar. 1999).

Advisory Action and AFCP 2.0 Decision for U.S. Appl. No. 16/269,498 (dated Jul. 27, 2020).

Final Office Action for U.S. Appl. No. 16/269,498 (dated May 8, 2020).

Commonly-assigned, co-pending U.S. Appl. No. 16/869,129 for "Methods, Systems, and Computer Readable Media for Testing Network Elements of an In-Band Network Telemetary Capable Network," (Unpublished, filed May 7, 2020).

Notice of Allowance and Fee(s) Due for U.S. Appl. No. 16/290,426 (dated May 7, 2020).

Hill et al., "Tracking Network Flows with P4," University of Amsterdam, System and Network Engineering, pp. 1-16 (2018).

Notice of Allowance and Fee(s) Due for U.S. Appl. No. 16/181,309 (dated Mar. 19, 2020).

Notice of Allowance and Fee(s) Due for U.S. Appl. No. 16/290,426 (dated Mar. 18, 2020).

* cited by examiner

METHODS, SYSTEMS, AND COMPUTER READABLE MEDIA FOR TESTING A NETWORK NODE USING SOURCE CODE FOR PROGRAMMING A PACKET FORWARDING PLANE OF THE NETWORK NODE

TECHNICAL FIELD

The subject matter described herein relates to testing devices. More specifically, the subject matter relates to methods, systems, and computer readable media for testing a network node using source code.

BACKGROUND

Network operators generally prefer network architectures that are scalable and cost efficient. Network function virtualization (NFV) is a network architecture concept that utilizes virtualized network functions (VNFs) (e.g., virtual machines or virtual containers executing software and processes configured to perform one or more network functions) that can execute on cloud-based or shared physical resources. By using VNFs to perform network functions, network operators can scale their network based on current workload or demand, e.g., by starting and stopping instances of VNFs as needed. Further, by using VNFs, the need for custom hardware appliances for each network function is abated.

Various tools and applications are available for configuring or programming network nodes (e.g., physical network nodes and/or VNFs). One such tool is a programming language, named P4, usable for programming the data plane (e.g., data packet processing) of a network node e.g., a VNF or a programmable network device. The P4 language is designed to be implementation- or target-independent, protocol independent, and field reconfigurable. For example, P4 source code can be compiled for many different types of targets, has no native support for network protocols, and allow operators to change the way a target (e.g., a central programming unit (CPU), a network processor, a field programmable gate array (FPGA), or an application specific integrated circuits (ASIC)) processes packets after deployment. However, issues can arise when utilizing the P4 language and similar tools. In particular, a network operator needs to be able to effectively test network nodes, including any P4 source code related functionality. While conventional test tools may be designed for hardware appliances with fixed functionality, such tools are not well-suited for testing network nodes with reconfigurable features, e.g., via the P4 programming language.

Accordingly, in light of these difficulties, a need exists for improved methods, systems, and computer readable media for testing a network node using source code.

SUMMARY

Methods, systems, and computer readable media for testing a network node using source code are disclosed. According to one method, the method occurs at a network equipment test device. The method includes receiving one or more source code files for programming a packet forwarding plane of a network node; analyzing the one or more source code files to determine test metadata, wherein analyzing the one or more source code files to determine the test metadata includes identifying source code portions that indicate conditions for rejecting or accepting packets and determining the test metadata based on the conditions; generating, using the test metadata, one or more test plans for testing the network node, wherein the one or more test plans define test packets to be sent to the network node for testing the network node's implementation of the conditions for rejecting or accepting packets; and testing the network node using the one or more test plans.

According to one system, the system includes a network equipment test device. The network equipment test device includes at least one processor and memory. The network equipment test device is configured for: receiving one or more source code files for programming a packet forwarding plane of a network node; analyzing the one or more source code files to determine test metadata, wherein analyzing the one or more source code files to determine the test metadata includes identifying source code portions that indicate conditions for rejecting or accepting packets and determining the test metadata based on the conditions; generating, using the test metadata, one or more test plans for testing the network node, wherein the one or more test plans define test packets to be sent to the network node for testing the network node's implementation of the conditions for rejecting or accepting packets; and testing the network node using the one or more test plans.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function" and "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for testing a network node using source code. When testing one or more network nodes, it may be desirable to model a test or related workload such that the test is relevant to real-world scenarios and conditions.

In accordance with some aspects of the subject matter described herein, a network equipment test device or a related entity may generate test metadata (e.g., test plans, test variables and related test values, test conditions, test actions, etc.) for testing network equipment, e.g., a network node. For example, a network equipment test device may test a virtualized network function (VNF), such as a virtual switch, that is programmed or configured using one or more P4 source code files. In this example, the network equipment test device or a related entity may receive and analyze the P4 source code files to determine test metadata, e.g., the source code may be analyzed to identify a required sequence of headers, to identify field values that are to be tested, and/or to identify positive (e.g., valid) and negative (e.g., invalid) test conditions. Continuing with this example, the network equipment test device or a related entity (e.g., a packet generator) may generate test traffic for testing the network node, e.g., based on the identified test metadata and/or related test plans (e.g., protocol templates, packet templates, flow templates, test templates, etc.).

By using source code to generate test metadata and/or related test plans, a network equipment test device in accordance with aspects described herein can facilitate setting up one or more tests for a network node quickly and efficiently. For example, by using P4 source code of a VNF to generate test metadata, a network equipment test device in accordance with aspects described herein can quickly identify aspects of the VNF (e.g., protocol structures, valid and invalid parameter values, expected processing actions, etc.) to test and at least some values (e.g., protocol header field values) to use for testing which can significantly reduce the amount of time needed for test configuration by a human operator.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
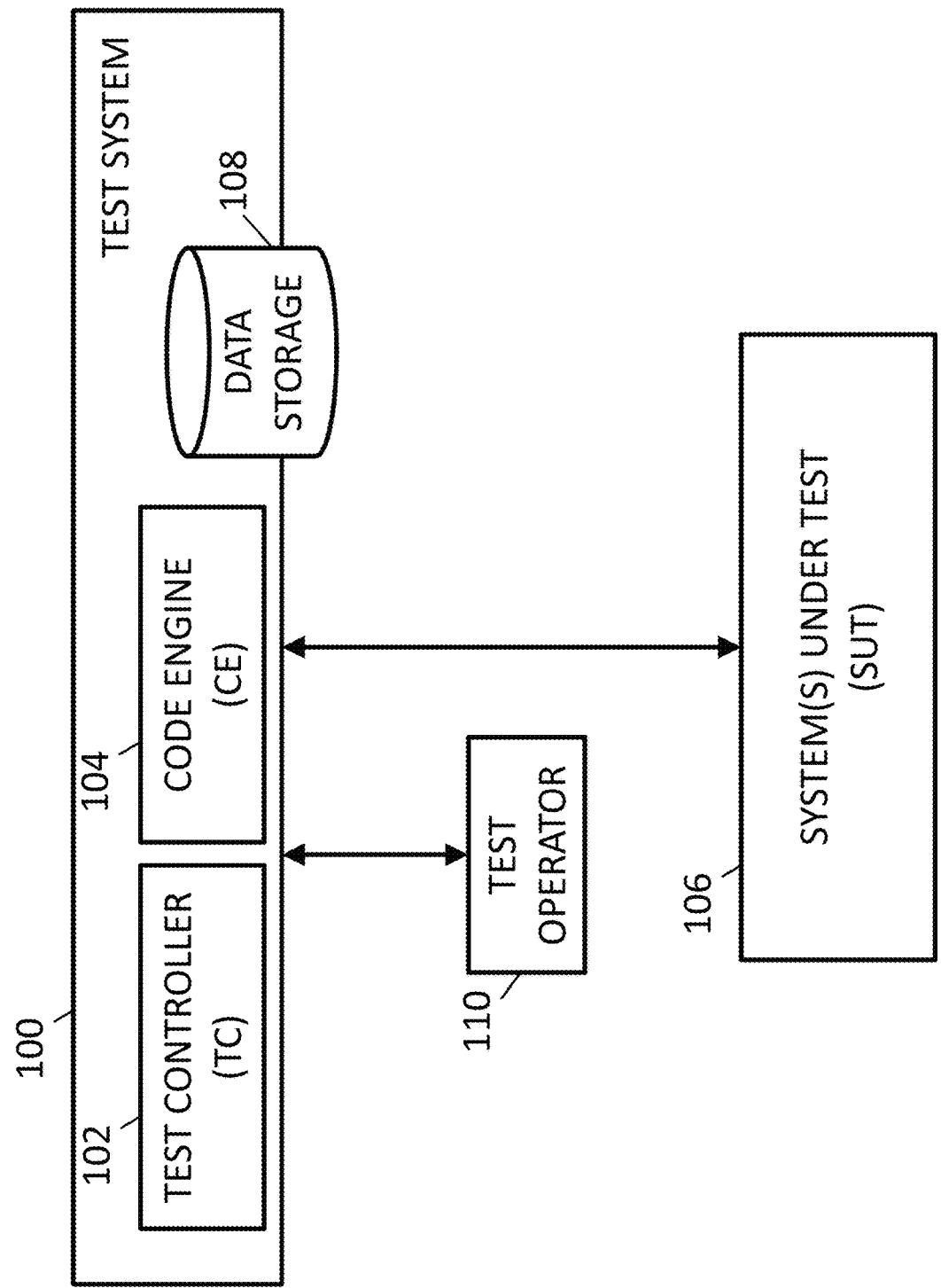
FIG. 1 is a diagram illustrating an example test system for testing a network node using source code.

FIG. 1 is a diagram illustrating an example test system 100 for testing a network node using source code. Referring to FIG. 1, an example environment may include test system 100 and one or more device(s) and/or system(s) under test (SUT) 106. Test system 100 may represent any suitable entity or entities (e.g., one or more computing platforms, nodes, or devices) associated with testing SUT 106 (e.g., one or more security devices). For example, test system 100 may generate and send traffic to SUT 106 and/or receive traffic from SUT 106 and may analyze one or more performance aspects associated with SUT 106.

SUT 106 may be any suitable entity or entities (e.g., devices, systems, or platforms) for receiving, processing, forwarding, and/or sending one or more messages (e.g., packets). In some embodiments, SUT 106 may include a network node, e.g., a network switch, a network router, a network interface card, a packet forwarding device, or one or more VNFs. For example, SUT 106 or a VNF thereof may be software and/or a VM executing on shared resources (e.g., compute, storage, and network resources in a cloud computing environment). In some embodiments, SUT 106 or related logic (e.g., rules associated with packet forwarding/processing) may be configured or programmed using one or more programming languages, e.g., the P4 language maintained by the P4 Language Consortium.

In some embodiments, test system 100 may include a stand-alone tool, a testing device, a network equipment test device or platform, or software executing on one or more processor(s). In some embodiments, test system 100 may be a single device or node or may be distributed across multiple devices or nodes. In some embodiments, test system 100 may include one or more modules for performing various test related functions. For example, test system 100 may include a traffic (e.g., packet) generator for generating test traffic and/or a code engine for analyzing source code of SUT 106 to identify or determine test metadata for testing SUT 106.

Test system 100 may include a test controller (TC) 102, a code engine (CE) 104, and a data storage 108. TC 102 may be any suitable entity or entities (e.g., software executing on a processor, a field-programmable gateway array (FPGA), and/or an application-specific integrated circuit (ASIC), or a combination of software, an FPGA, and/or an ASIC) for performing one or more aspects associated with testing SUT 106 and/or various aspects thereof. In some embodiments, TC 102 may be implemented using one or more processors and/or memory. For example, TC 102 may utilize one or more processors (e.g., executing software stored in memory) to generate test packets for various message streams (e.g., flows or sessions). In another example, TC 102 may also utilize one or more processors to perform or initiate various tests and/or analyses involving test packets and/or related responses from SUT 106. In this example, TC 102 may send instructions to various modules or entities in test system 100 for controlling (e.g., pause, restart, or stop) a test session.

CE 104 may be any suitable entity or entities for performing one or more aspects associated with processing source code or related source code files. In some embodiments, CE 104 may be implement various functions using one or more processors and/or memory. For example, CE 104 may compile or interpret source code into intermediate or machine code for execution at SUT 106. In another example, CE 104 may analyze or inspect source code for generating test metadata (e.g., header field values, field names, field size, or test conditions) usable for testing SUT 106. In this example, CE 104 may identify particular source code primitives or related code portions and use information therein to generate relevant test metadata for testing packet parsing, packet processing, or other actions defined in the source code.

In some embodiments, TC 102 and/or CE 104 may include one or more communications interfaces (e.g., one or more receive port modules and one or more transmit port modules) for interacting with users, modules, and/or nodes. For example, port modules may include network interface cards (NICs) or other suitable hardware, firmware, and/or software for receiving or transmitting data via ports (e.g., physical or logical communication end points).

In some embodiments, TC 102 and/or CE 104 may include or provide a communications interface for communicating with a test operator 110. In such embodiments, test operator 110 may be any entity (e.g., an automated system or a device or system controlled or controllable by a human user) for selecting and/or configuring various aspects associated with testing and/or generating testing related metrics.

For example, user interfaces (e.g., an application programming interface (API) and a graphical user interface (GUI)) may be provided for inputting or modifying configuration information, such as tests to be performed, types of metrics or statistics to be generated, and/or other settings.

In some embodiments, one or more user interfaces at test system 100 may support automation e.g., via one or more programming languages (e.g., python, PHP, etc.), a representation state transfer (REST) API, a command line, and/or a web based GUI. For example, test operator 110 may use a web browser to interact with a web based GUI at TC 102 or CE 104 for programming or configuring one or more aspects for testing SUT 106.

In some embodiments, TC 102 or CE 104 may communicate with test system 100 and/or other related entities to receive test configuration information (e.g., test metadata) usable to set up and/or execute one or more test sessions. For example, test configuration information may be derived or obtained by analyzing P4 source code files. In this example, the test configuration information may be used to generate test plans usable for generating and sending particular traffic and/or flows to SUT 106.

In some embodiments, TC 102, CE 104, and/or other entities in test system 100 may include functionality for accessing data storage 108 or other memory. Data storage 108 may be any suitable entity or entities (e.g., a storage device, memory, a non-transitory computer readable medium, or a storage system) for maintaining or storing information related to testing. For example, data storage 108 may store message capture related information, e.g., time delta information, timestamp related data, and/or other information. In this example, message capture related information may be usable to determine, derive, or compute one or more test related statistics, such time variation metrics for indicating scheduling fidelity.

In some embodiments, data storage 108 may also contain information usable for generating statistics and/or metrics associated with one or more aspects of SUT 106. For example, data storage 108 may contain metrics associated with one or more performance aspects of SUT 106 during one or more test scenarios. In this example, data storage 108 may maintain a particular set of computed metrics for a first test session or message stream and may maintain another set of computed metrics for a second test session or a different message stream. In some embodiments, data storage 108 and/or memory may be located at test system 100, another node, or distributed across multiple platforms or devices.

In some embodiments, test system 100 or one or more entities therein (e.g., TC 102 and/or CE 104) may be configured for analyzing source code or related files associated with SUT 106 and for generating test metadata for testing SUT 106. For example, CE 104 may parse a P4 source code file (e.g., a 'switch.p4' file) and may extract or derive a packet format definition (e.g., headers, header fields, and other data) and packet processing logic from the P4 source code file. In this example, CE 104 may use this extracted or derived data to generate test metadata, which may use to create test traffic (e.g., via a packet generator) and/or to automatically generate one or more test plans for testing aspects of SUT 106, e.g., a protocol implementation defined in the P4 source code file.

In some embodiments, test system 100 or one or more entities therein (e.g., TC 102 and/or CE 104) may inspect source code or related files associated with SUT 106 for identifying corner cases (e.g., scenarios that occur outside normal operating conditions) and using these identified corner cases to automatically add variations to one or more test plans to test the corner cases. For example, CE 104 may identify 'define' code portions indicating valid values for an Ethernet 'ethertype' field. In this example, using the information from the 'define' code portions, CE 104 may generate test metadata that define, trigger, or yield packets with invalid 'ethertype' values and may generate test metadata that define, trigger, or yield packets with valid 'ethertype' values.

In some embodiments, test system 100 or one or more entities therein (e.g., TC 102 and/or CE 104) may be configured to automatically identify and integrate "new protocols" defined in source code or related files for test configuration. For example, test system 100 (e.g., an IxNetwork test system) may include a configuration GUI that can parse test metadata generated from source code. In this example, test system 100 or a related entity may identify a new protocol defined in the test metadata and may use the new protocol for configuring test traffic for testing SUT 106. Continuing with this example, test system 100 or a related entity may invoke properly configured packet generators to generate test traffic, variation in test traffic, statistics, and flow tracking usable for testing SUT 106 based on the new protocol and/or other test metadata derived from the source code.

In some embodiments, test system 100 or one or more entities therein (e.g., TC 102 and/or CE 104) may be configured to monitor performance of SUT 106 and/or display performance metrics to test operator 110. For example, test system 100 may include network interface cards or receive ports therein for observing responses to test packets from SUT 106. In this example, the receive ports may be configured to perform or monitor various metrics or statistics (e.g., packet loss, latency, jitter, etc.) based on one or more user- or system-defined tracking header fields. Continuing with this example, statistics, performance metrics, and/or other data associated with testing SUT 106 may be provided or displayed to test operator 110 via a GUI or other interface.

In some embodiments, test system 100 or another entity (e.g., CE 104) may generate a number of test plans (e.g., protocol templates, packet templates, flow templates, test templates, etc.) or related information. For example, CE 104 or another entity may generate test plans that are based on possible combinations of protocol headers defined in a source code file (e.g., a P4 file). In this example, CE 104 or another entity may traverse a related parse graph for visiting processing states from a 'start' state to an 'accept' or 'reject' state. Continuing with this example, by inspecting the parse graph of a source code file, CE 104 or another entity may identify a sequence of headers for testing one or more paths of the parser. In some embodiments, for a depth first traversal of all paths in a parse graph, multiple test plans may be generated for testing these paths.

In some embodiments, test system 100 or another entity (e.g., CE 104) may identify protocol field values and/or related value selection modes (e.g., patterns) for testing SUT 106. For example, CE 104 or another entity may identify and/or inspect 'verify' and 'select' conditions in each parse state defined in a source code file and may use these conditions to generate test metadata that indicate values of specific fields in test packets for testing SUT 106. In another example, CE 104 or another entity may identify and/or inspect 'key' and the 'entries' from tables defined in a source code file and may use this information to generate test metadata that indicate values of specific fields in test packets for testing SUT 106. In another example, CE 104 or another entity may also identify and/or inspect conditions associated with table actions defined in a source code file and may use this information to generate test metadata for testing SUT 106.

In some embodiments, test system 100 or another entity (e.g., CE 104) may generate one or more test plans for testing SUT 106 with valid values (e.g., parameter field values) and may also generate one or more test plans for testing SUT 106 with invalid values. For example, CE 104 or another entity may generate one or more 'reject' test plans that define, trigger, or yield packets that are to be rejected by SUT 106. In this example, assuming SUT 106 supports a multiprotocol label switching (MPLS) header stack of depth of three, CE 104 or another entity may generate a first 'reject' test plan that define, trigger, or yield packets with zero MPLS headers and a second 'reject' test plan that define, trigger, or yield packets with four MPLS headers. Continuing with this example, SUT 106 should rejects test packets associated with both the first and the second 'reject' test plan. In another example, CE 104 or another entity may generate one or more 'accept' test plans that define, trigger, or yield packets that are to be accepted by SUT 106. In this example, assuming SUT 106 supports a multiprotocol label switching (MPLS) header stack of depth of three, CE 104 or another entity may generate an 'accept' test plan that define, trigger, or yield packets with three MPLS headers.

In some embodiments, test system 100 or another entity (e.g., CE 104) may generate or include source file metadata and/or other information in test plans. For example, when generating a test plan based on a P4 source code file, CE 104 or another entity may include source file information, source file date, a version number, etc. in the test plan.

In some embodiments, a test plan may also include a plan description and a summary of how the plan relates to a test case (e.g., condition or scenario being tested). For example, a test plan may include useful information to distinguish a plan with invalid header field values from a test plan with valid header field values. In another example, a test plan may include topology information discovered or derived from a P4 source code file and various data emitted by CE 104 or a related compiler, e.g., a source code file name, a date of import, a version number of a test tool, etc.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
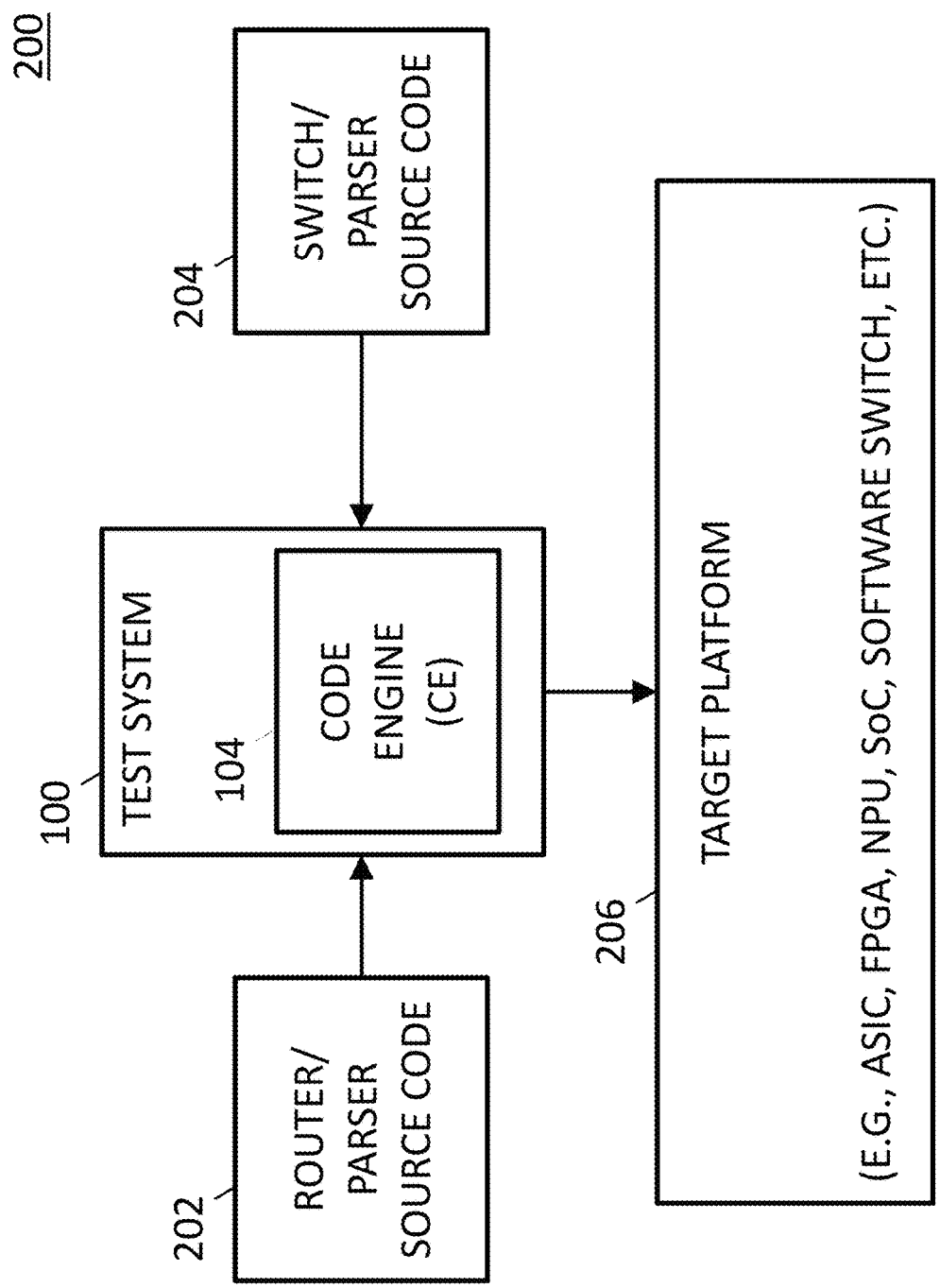
FIG. 2 is a diagram illustrating an example code engine (CE) for processing source code.

FIG. 2 is a diagram illustrating an example environment 200 for processing source code for programming SUT 106. Referring to FIG. 2, test system 100 may include CE 104. In some embodiments, CE 104 may include functionality for processing source code and/or related files, e.g., router/parser source code 202 and switch/parser source code 204. Each of router/parser source code 202 and switch/parser source code 204 may represent source code for programming one or more aspects of a network node, e.g., a router, a switch, a network interface card, a programmable network device, or a VNF. For example, router/parser source code 202 may be one or more P4 source code files for programming a router and/or its related data plane (e.g., how it processes and routes packets). In another example, switch/parser source code 204 may be one or more P4 source code files for programming a switch and/or its related data plane (e.g., how it processes and switches packets).

In some embodiments, CE 104 may include functionality for validating source code and/or related file formats (e.g., P4 source code files). For example, CE 104 may validate that switch/parser source code 204 is from an authorized source and/or may confirm that switch/parser source code 204 can be interpreted or compiled into valid machine code for execution. In this example, CE 104 may notify a network operator and/or may store various details if errors are found in the source code or other issues are detected.

In some embodiments, CE 104 may include functionality for compiling and/or interpreting source code into machine code, byte code, or other code (e.g., intermediate code) for implementation or executing at a target platform 206. For example, CE 104 may compile or interpret P4 source code into a JavaScript Object Notation (JSON) formatted behavioral model usable by a C++ implemented software switch (e.g., bmv2).

Target platform 206 may represent various entities for executing source code or related logic (e.g., compiled machine code). For example, target platform 206 may include a general-purpose network programming unit (NPU) (e.g., a network processor), a compute programming unit (CPU), a field programmable gate array (FPGA), a software switch (e.g., executing on one or more general processors), a system-on-chip (SoC), or an application specific integrated circuit (ASIC). In some embodiments, target platform 206 may require a compiler (e.g., software embedded in target platform 206 or CE 104) for mapping or converting P4 code into byte or machine code that represents a target machine model. In this example, the byte or machine code generated will be dependent on target platform 206.

In some embodiments, CE 104 may include functionality for analyzing source code and/or related files (e.g., router/parser source code 202 and switch/parser source code 204) to identify code portions that are usable for deriving or obtaining test metadata. For example, CE 104 may include a test metadata generator that obtains and/or derives test metadata based on certain keywords or code sections. In this example, the test metadata may be used to generate test plans and/or related test packets for testing SUT 106.

It will be appreciated that FIG. 2 is for illustrative purposes and that various nodes, their locations, and/or their functions described above in relation to FIG. 2 may be changed, altered, added, or removed. For example, some nodes and/or functions may be combined into a single entity. Further, while FIG. 2 discloses router/parser source code 202 and switch/parser source code 204 as source code examples, it will be appreciated that other source code files may be usable for programming a programmable network device or VNF, e.g., a load balancing function, an intrusion detection function, an intrusion protection function, an antivirus function, an antispam function, a firewall function, a switching function, or a routing function.

Figure 3:
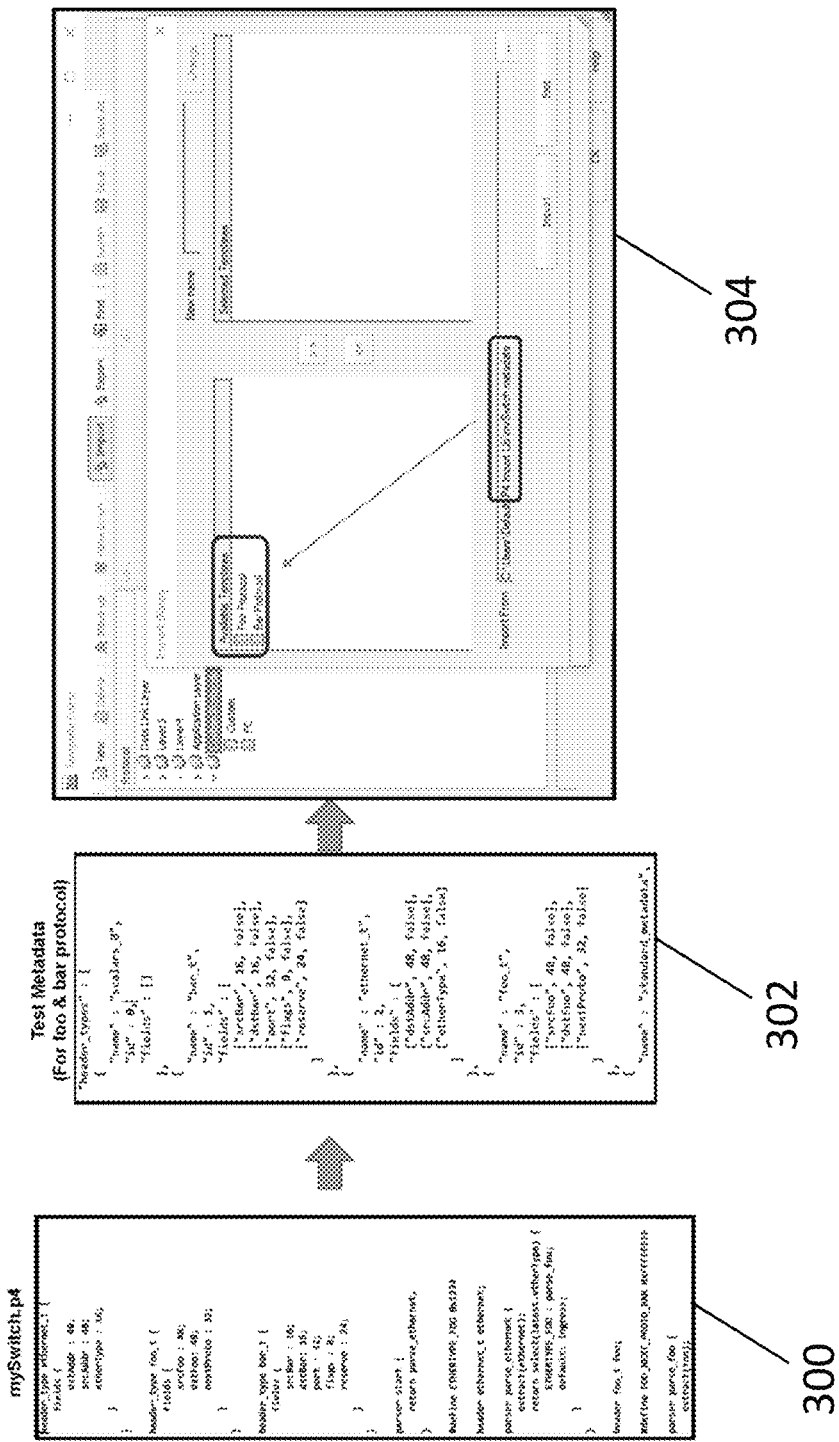
FIG. 3 is a diagram illustrating an example user interface for importing test metadata derived from source code.

FIG. 3 is a diagram illustrating an example user interface 304 for importing test metadata 302 derived from source code 300. In some embodiments, e.g., where test system 100, TC 102, CE 104, and/or another entity includes or incorporates a source code compiler, source code 300 may be imported directly into test system 100 and test metadata 302 may be generated (e.g., derived from) source code 300 by test system 100 or an entity therein (e.g., CE 104).

In some embodiments, test system 100, TC 102 and/or another entity may include user interface 304 for configuring a test session or related aspects (e.g., a test plan). For example, after CE 104 analyzes source code 300 and derives and/or generates test metadata 302, test operator 110 may select one or more files containing test metadata 302 via user interface 304. In this example, after importing test metadata 302 into TC 102 using user interface 304, test operator 110 may use a test plan configuration GUI (e.g., a template editor) to modify or change a test plan that defines test traffic to send to SUT 106 during a test session. In another example, test system 100 and/or CE 104 may receive and analyze source code 300, generate test metadata 302, and automatically import and/or use test metadata 302 for creating or modifying a test plan or for performing other test related configuration in test system 100.

Referring to FIG. 3, source code 300 may represent code from a P4 file. For example, source code 300 may include information for defining a data plane of a switch. In this example, source code 300 may define valid packet structure, protocol structure, related header fields, and/or values for one or more fields associated with one or more protocols that a switch can parse and/or process.

In some embodiments, test system 100 or a related entity (e.g., CE 104) may analyze source code 300 for relevant code portions usable to generate test metadata 302. For example, test system 100 or a related entity (e.g., CE 104) may be configured to identify and inspect fields data structures in 'header_type' code portions (e.g., 'header_type ethernet_t' and 'header_type foo-t', and 'header_type bar_t' portions) and may use these data structures to determine field names for one or more protocol headers. In another example, test system 100 may identify and inspect 'verify', 'define' and 'select' code portions in source code 300 and may use data therein to identify test conditions and/or determine values of protocol fields for test metadata 302.

Test metadata 302 may represent data usable for configuring or defining a test plan for testing SUT 106. For example, test metadata 302 may include various data regarding two protocols (e.g., Foo and Bar) defined or mentioned in source code 300. In this example, test metadata 302 may include field names, byte length or sizes, and Boolean values indicating whether the field values are to be validated or tested.

User interface 304 can allow test metadata 302 derived from source code 300 to be imported. For example, after CE 104 analyzes source code 300, generates test metadata 302 derived from source code 300, and creates a metadata file containing test metadata 302, test operator 110 can input the file name (e.g., 'switch.metadata') of the metadata file in an import dialog of a template editor GUI, e.g., of test system 100 or a related entity (e.g., TC 102). In this example, once a file name is inputted, test system 100 or a related entity may inspect the file for available protocol templates in the test metadata 302. In another example, test system 100, TC 102, or another entity (e.g., CE 104) may generate and utilize test metadata 302 automatically in test system 102. In this example, prior to test metadata 302 being automatically generated and imported, test operator 110 may use user interface 300 or another user interface for selecting source code files from which test metadata 302 is derived or obtained.

In some embodiments, test system 100 or a related entity (e.g., TC 102) may generate and use protocol templates based on test metadata 302 and/or use imported protocol templates to configure test plans or related information for a traffic generator and/or other testing entities. For example, test system 100 or a related entity may generate test traffic for testing SUT 106 based on test metadata 302 that indicates valid and/or invalid packet and/or protocol structure based on the imported protocol templates.

It will be appreciated that FIG. 3 is for illustrative purposes and that various aspects described above in relation to FIG. 3 may be changed, altered, added, or removed. For example, some user interface elements and/or features described in FIG. 3 may be removed or modified.

Figure 4:
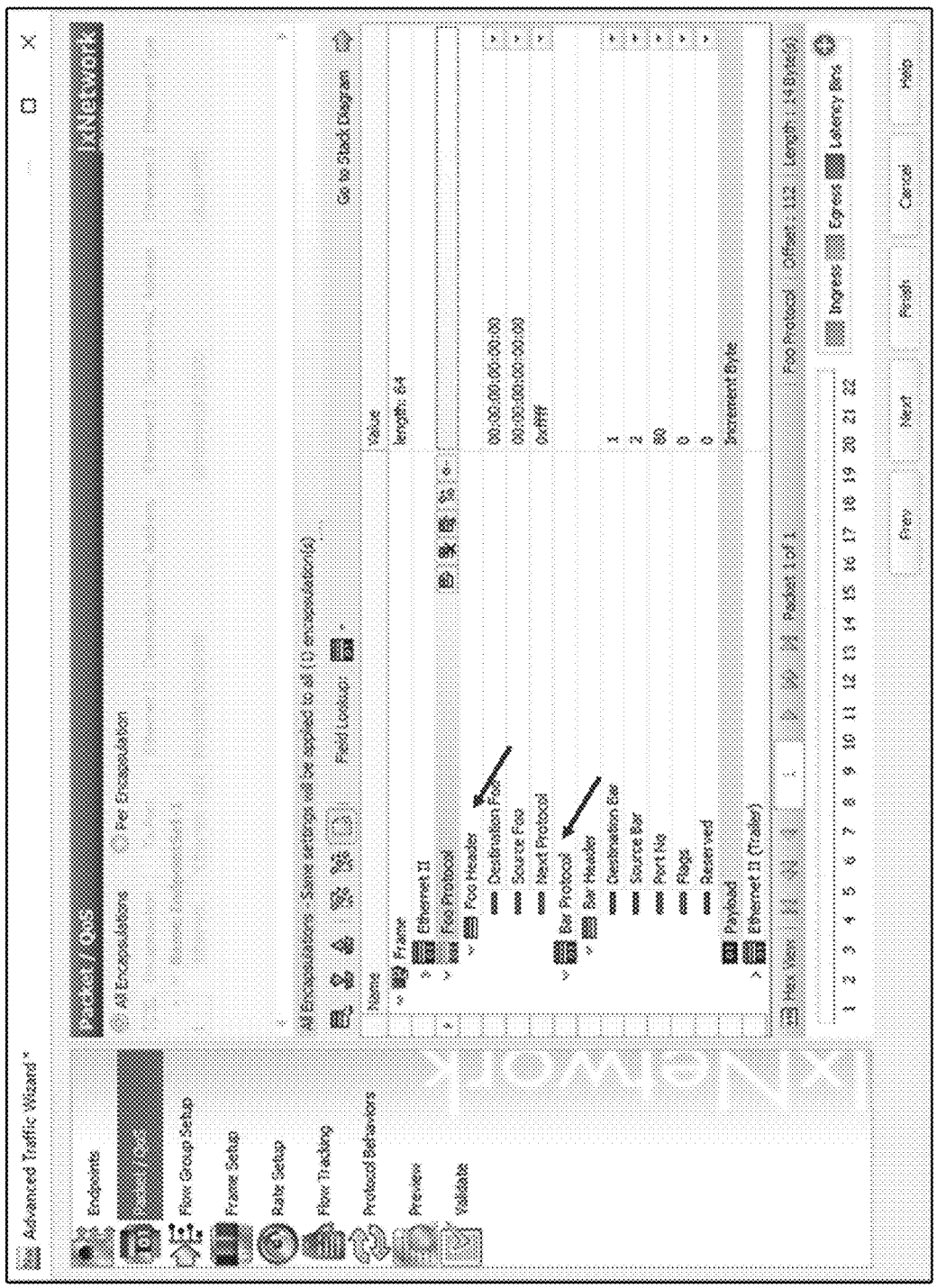
FIG. 4 is a diagram illustrating an example user interface for displaying protocol components defined in source code.

FIG. 4 is a diagram illustrating an example user interface 400 for displaying protocol components defined in source code. In some embodiments, test system 100, TC 102 and/or another entity may include user interface 400 for configuring a test session or related aspects. For example, test operator 110 may view various protocol components (e.g., frame length, frame/packet structure, protocol fields and related values) defined in source code or from test metadata derived therefrom via user interface 400.

In some embodiments, user interface 400 can provide a graphical view for one or more protocols derived or imported from P4 files. For example, a P4 file may indicate that a frame or packet can include an Ethernet II header, a Foo Protocol header, and a Bar Protocol header. In this example, test metadata indicating this packet structure may be uploaded or imported into a TC 102 and/or another entity, whereby user interface 400 can display the packet structure (e.g., protocol stack) in a 'tree view' user interface element.

It will be appreciated that FIG. 4 is for illustrative purposes and that various aspects described above in relation to FIG. 4 may be changed, altered, added, or removed. For example, some user interface elements and/or features described in FIG. 4 may be removed or modified.

Figure 5:
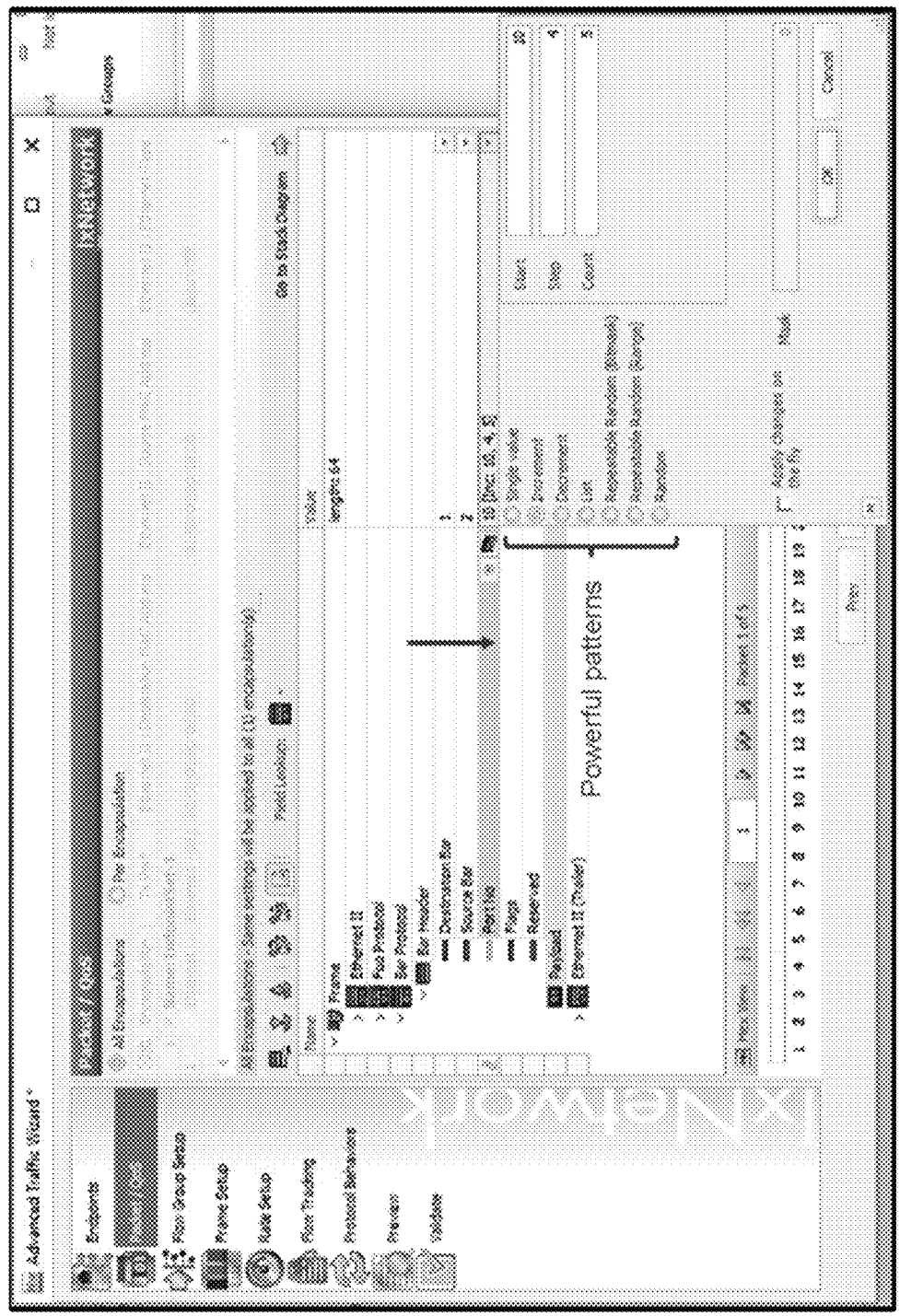
FIG. 5 is a diagram illustrating an example user interface for configuring field values of test packets.

FIG. 5 is a diagram illustrating an example user interface 500 for configuring field values of test packets. In some embodiments, test system 100, TC 102 and/or another entity may include user interface 500 for configuring a test session or related aspects. For example, test operator 110 may configure or select various values for protocol header fields for a test session via user interface 500. In this example, the values used during a test session may be based on one or more value selection modes, such as an incrementing pattern, where a user can configure the pattern by entering a start value, a step or increment value, and a count value (e.g., how many times to increment before starting over at the start value).

In some embodiments, user interface 600 can allow selection of values for one or more fields for a test session or related test plan. For example, a user can select values of a port number field or a flags field of a Bar protocol (e.g., the Bar protocol being imported or derived from a P4 file) to use for testing SUT 106. In some embodiments, user interface 600 can provide a list of radio box or other user interface element(s) for selecting and/or configuring a value selection mode. Example value selection modes may be a single value, an incrementing pattern, a decrementing pattern, a list of values, a repeatable random (bitmask) pattern, a repeatable random (range) pattern, or a random pattern (e.g., non-repeatable pattern).

It will be appreciated that FIG. 5 is for illustrative purposes and that various aspects described above in relation to FIG. 5 may be changed, altered, added, or removed. For example, some user interface elements and/or features described in FIG. 5 may be removed or modified.

Figure 6:
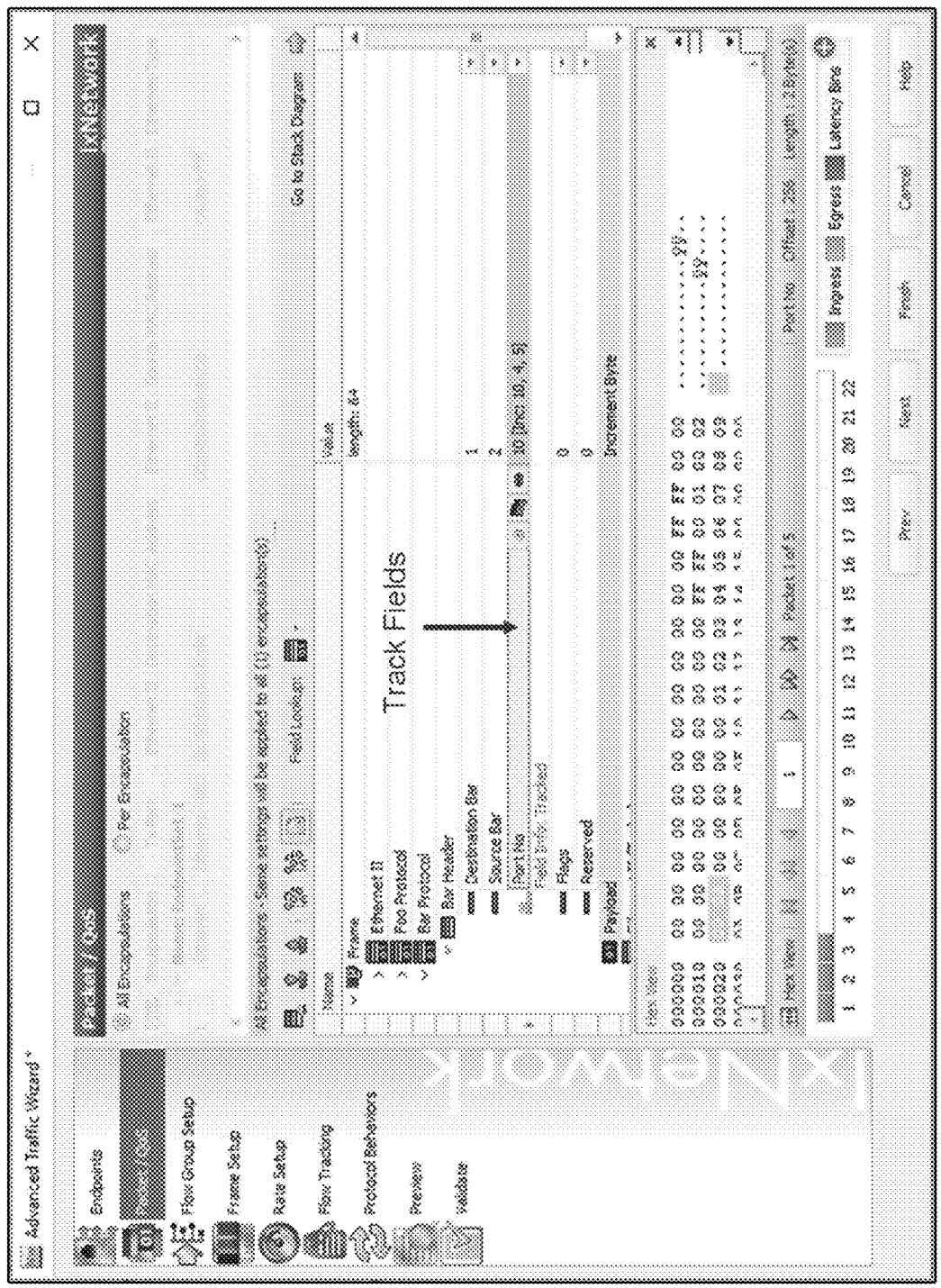
FIG. 6 is a diagram illustrating an example user interface for line rate tracking during testing.

FIG. 6 is a diagram illustrating an example user interface 600 for line rate tracking during testing. In some embodiments, test system 100, TC 102 and/or another entity may include user interface 600 for monitoring a test session or related aspects. For example, test operator 110 may monitor line rates for egress and/or ingress traffic via user interface 600. In this example, line rates may be determined based on one or more protocol fields, e.g., a port number field of a Bar protocol.

In some embodiments, user interface 600 can allow selection of one or more fields for line rate tracking. For example, a user can select a port number field of a Bar protocol (e.g., a field imported or derived from a P4 file)

which can be used to track ingress and egress traffic. In some embodiments, user interface 600 can provide hex views of one or more received or sent packets. For example, user interface 600 can highlight particular portions of a packet that is being tracked (e.g., port number field and/or another field). In some embodiments, user interface 600 may display latency bins (e.g., bins indicative of different amounts of latency) for ingress and/or egress traffic.

It will be appreciated that FIG. 6 is for illustrative purposes and that various aspects described above in relation to FIG. 6 may be changed, altered, added, or removed. For example, some user interface elements and/or features described in FIG. 6 may be removed or modified.

Figure 7:
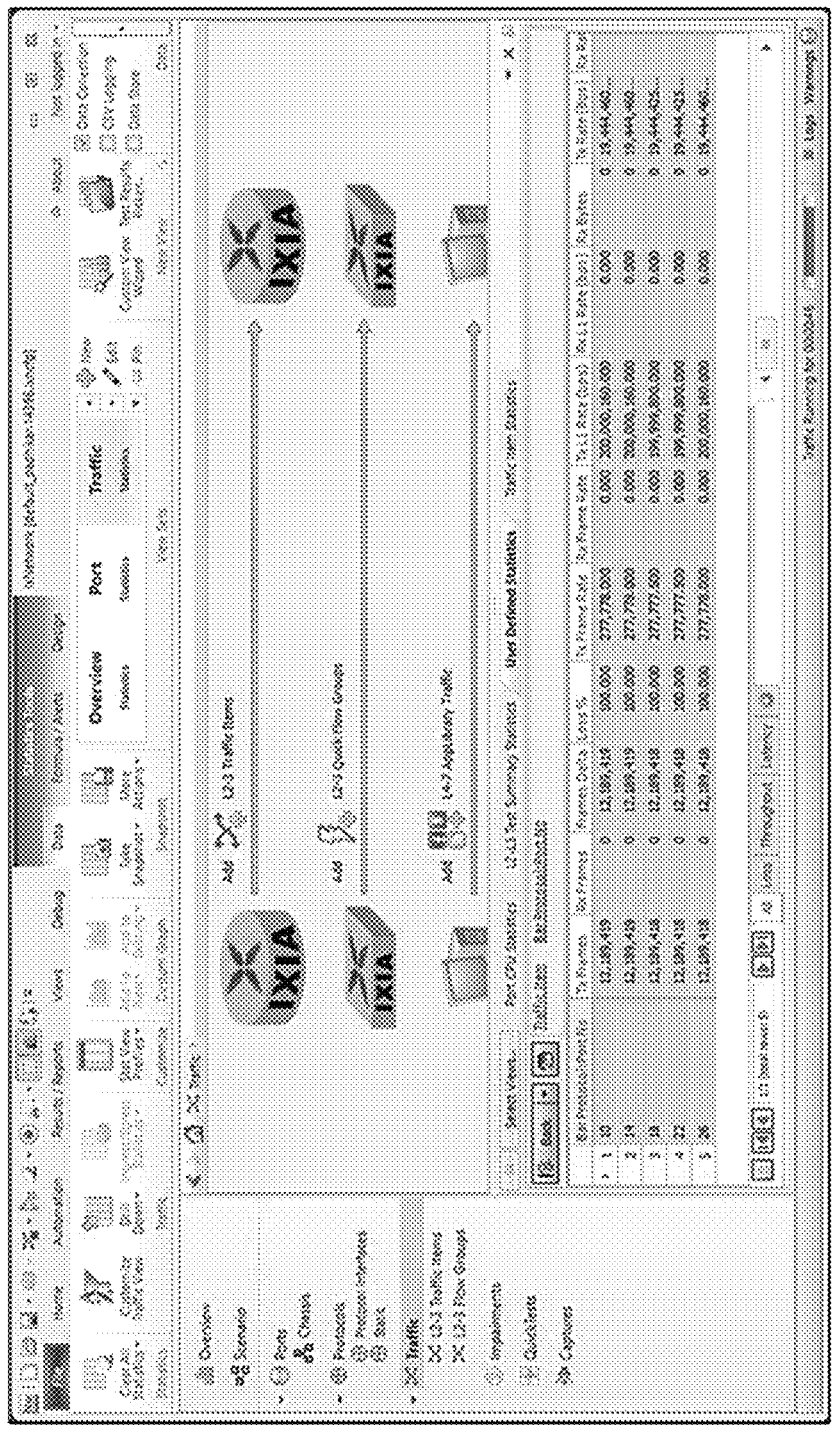
FIG. 7 is a diagram illustrating an example user interface for displaying test related statistics.

FIG. 7 is a diagram illustrating an example user interface 700 for displaying test related statistics. In some embodiments, test system 100, TC 102 and/or another entity may include user interface 700 for displaying statistics of a test session or related information. For example, test operator 110 may view statistics based on field values of test traffic via user interface 700.

In some embodiments, user interface 700 may include user interface elements that indicate statistics for egress test traffic based on port number of a Bar protocol. For example, test system 100 or a related entity may test SUT 106 by generating and sending a number of test packets (e.g., at line rate) to SUT 106. In this example, test operator 110 or a test plan may indicate one or more user defined statistics which may be based on field values associated with a protocol defined in a source code file (e.g., a P4 file). Continuing with this example, assuming some statistics are multi-layered or are based on different field values, user interface 700 can allow a user to "drill down" for statistics or more granular test details, e.g., based on one or more fields (e.g., fields in a protocol imported or derived from a P4 file).

It will be appreciated that FIG. 7 is for illustrative purposes and that various aspects described above in relation to FIG. 7 may be changed, altered, added, or removed. For example, some user interface elements and/or features described in FIG. 7 may be removed or modified.

Figure 8:
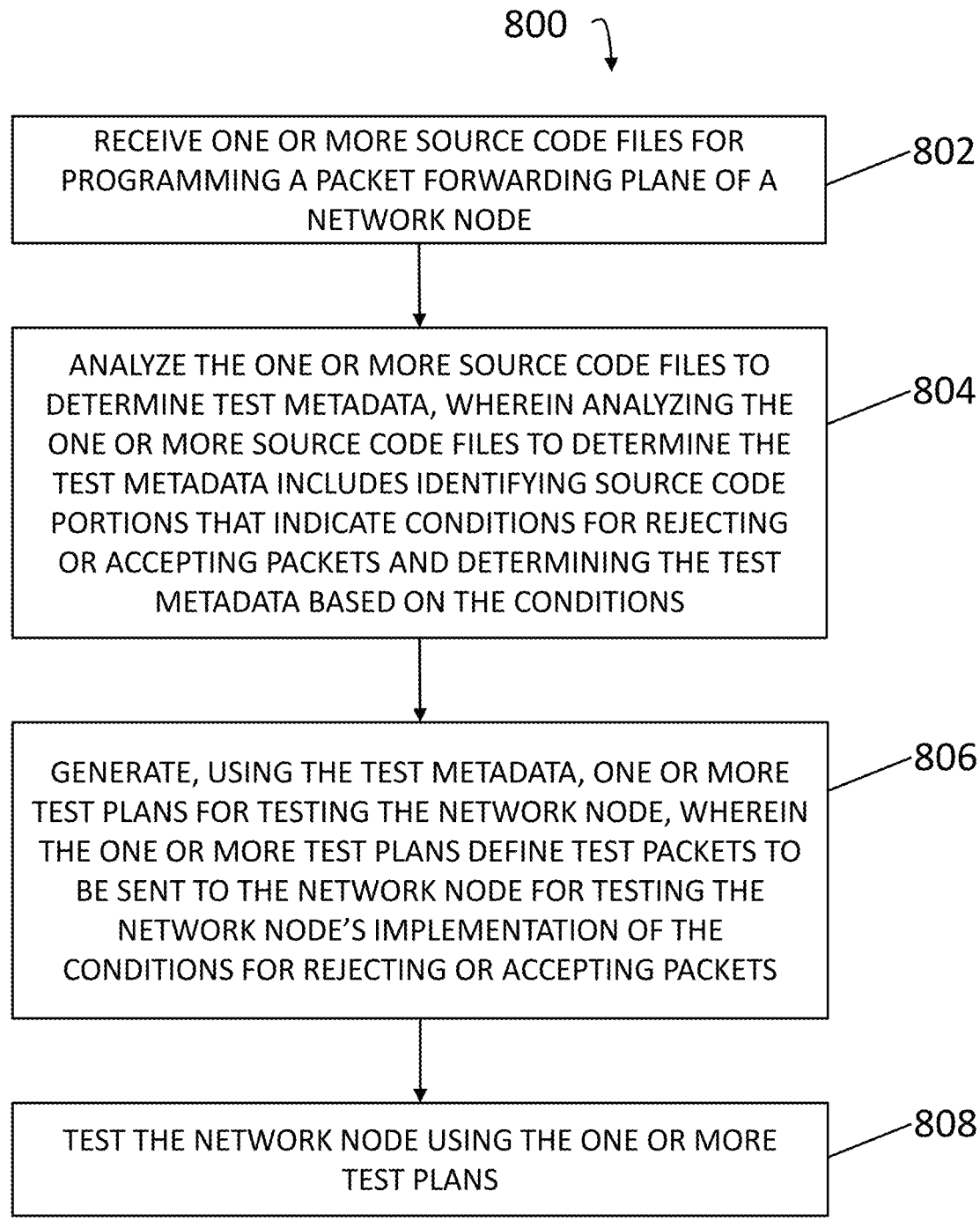
FIG. 8 is a diagram illustrating an example process for testing a network node using source code.

FIG. 8 is a diagram illustrating an example process for testing a network node using source code. In some embodiments, example process 800, or portions thereof, may be performed by or at test system 100 (e.g., a network equipment test device), TC 102, CE 104, and/or another node or module.

At step 802, one or more source code files for programming a packet forwarding plane of a network node may be received. For example, P4 source code files for defining a switch and a related parser may be received by CE 104. In some embodiments, the network node may include a router, a switch, a programmable network device, or a VNF. In some embodiments, the one or more source code files may include P4 programming language source code. In some embodiments, the one or more source code files may include protocol structure information, protocol field information, or protocol parsing information.

At step 804, the one or more source code files may be analyzed to determine test metadata, wherein analyzing the one or more source code files to determine the test metadata may include identifying source code portions that indicate conditions for rejecting or accepting packets and determining the test metadata based on the conditions. For example, test system 100 or a related entity (e.g., CE 104) may be configured to identify 'verify' and 'select' conditions in source code and may use these conditions to populate values of specific fields of test packets.

In some embodiments, the source code portions may include a specify code portion, a verify code portion, a define code portion, a table key and entries code portion, or a protocol fields code portion.

At step 806, one or more test plans for testing the network node may be generated using the test metadata, wherein the one or more test plans define test packets to be sent to the network node for testing the network node's implementation of the conditions for rejecting or accepting packets. For example, a test plan may be used by test system 100 or related entity (e.g., packet generator) to indicate test traffic that is to be sent to SUT 106. In this example, the test plan may indicate or define various aspects of a test session, including, for example, a number of media stream, how packet header values are to be determined (e.g., based on a specified pattern or selection mode), and what fields and/or statistics are to be tracked or recorded during a test session.

At step 808, the network node may be tested using the one or more test plans.

In some embodiments, analyzing the one or more source code files to determine the test metadata may include generating, using the one or more source code files, a parse data structure (e.g., a parse graph or map) indicating processing states for a protocol parser; traversing a path of the parse data structure to identify a sequence of packet headers indicative of valid packets; and generating, using the sequence of packet headers, a test plan that defines valid test traffic for testing the network node.

In some embodiments, after using a sequence of packet headers to generate a test plan that defines valid test traffic for testing a network node, a second test plan that defines invalid test traffic for testing the network node may be generated using the sequence of packet headers.

In some embodiments, after traversing a first path of a parse data structure, a second path of the parse data structure may be traversed to identify a second sequence of packet headers indicative of valid packets; and a second test plan that defines valid test traffic for testing a network node may be generated using the second sequence of packet headers.

In some embodiments, the network equipment test device may include a source code compiler, wherein the source code compiler converts source code in the one or more source code files into logic for implementing the packet forwarding plane of the network node, wherein the source code compiler sends the logic to the network node for execution.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing a network node using source code, the method comprising:

at a network equipment test device:

receiving one or more source code files for programming a packet forwarding plane of a network node;

analyzing the one or more source code files to determine test metadata, wherein analyzing the one or more source code files to determine the test metadata includes identifying source code portions that indicate conditions for rejecting or accepting packets and determining the test metadata based on the conditions, wherein analyzing the one or more source code files to determine the test metadata includes generating, using the one or more source code files, a parse data structure indicating processing states for a protocol parser; traversing a path of the parse data structure to identify a sequence of packet headers indicative of valid packets; and generating, using the sequence of packet headers, a test plan that defines valid test traffic for testing the network node;

generating, using the test metadata, one or more test plans for testing the network node, wherein the one or more test plans define test packets to be sent to the network node for testing the network node's implementation of the conditions for rejecting or accepting packets; and testing the network node using the one or more test plans.

2. The method of claim 1 wherein the one or more source code files include P4 programming language source code.

3. The method of claim 1 wherein the network node includes a router, a switch, a network interface card, a programmable network device, or a virtualized network function (VNF).

4. The method of claim 1 wherein the one or more source code files include protocol structure information, protocol field information, or protocol parsing information.

5. The method of claim 1 wherein the source code portions include a specify code portion, a verify code portion, a define code portion, a table key and entries code portion, or a protocol fields code portion.

6. The method of claim 1 comprising:
generating, using the sequence of packet headers, a second test plan that defines invalid test traffic for testing the network node.

7. The method of claim 1 comprising:
traversing a second path of the parse data structure to identify a second sequence of packet headers indicative of valid packets; and
generating, using the second sequence of packet headers, a second test plan that defines valid test traffic for testing the network node.

8. The method of claim 1 wherein the network equipment test device includes a source code compiler, wherein the source code compiler converts source code in the one or more source code files into logic for implementing the packet forwarding plane of the network node, wherein the source code compiler sends the logic to the network node for execution.

9. A system for testing a network node using source code, the system comprising:
at least one processor;
at least one memory; and
a network equipment test device implemented using the at least one processor and the at least one memory, wherein the network equipment test device is configured for:
receiving one or more source code files for programming a packet forwarding plane of a network node;
analyzing the one or more source code files to determine test metadata, wherein analyzing the one or more source code files to determine the test metadata includes identifying source code portions that indicate conditions for rejecting or accepting packets and determining the test metadata based on the conditions, wherein the network equipment test device is configured for generating, using the one or more source code files, a parse data structure indicating processing states for a protocol parser; traversing a path of the parse data structure to identify a sequence of packet headers indicative of valid packets; and generating, using the sequence of packet headers, a test plan that defines valid test traffic for testing the network node;

generating, using the test metadata, one or more test plans for testing the network node, wherein the one or more test plans define test packets to be sent to the network node for testing the network node's implementation of the conditions for rejecting or accepting packets; and testing the network node using the one or more test plans.

10. The system of claim 9 wherein the one or more source code files include P4 programming language source code.

11. The system of claim 9 wherein the network node includes a router, a switch, a network interface card, a programmable network device, or a virtualized network function (VNF).

12. The system of claim 9 wherein the one or more source code files include protocol structure information, protocol field information, or protocol parsing information.

13. The system of claim 9 wherein the source code portions include a specify code portion, a verify code portion, a define code portion, a table key and entries code portion, or a protocol fields code portion.

14. The system of claim 9 wherein the network equipment test device is configured for generating, using the sequence of packet headers, a second test plan that defines invalid test traffic for testing the network node.

15. The system of claim 9 wherein the network equipment test device is configured for:
traversing a second path of the parse data structure to identify a second sequence of packet headers indicative of valid packets; and
generating, using the second sequence of packet headers, a second test plan that defines valid test traffic for testing the network node.

16. The system of claim 9 wherein the network equipment test device includes a source code compiler, wherein the source code compiler converts source code in the one or more source code files into logic for implementing the packet forwarding plane of the network node, wherein the source code compiler sends the logic to the network node for execution.

17. A non-transitory computer readable medium comprising computer executable instructions embodied in the computer readable medium that when executed by at least one processor of a computer perform steps comprising:
receiving one or more source code files for programming a packet forwarding plane of a network node;
analyzing the one or more source code files to determine test metadata, wherein analyzing the one or more source code files to determine the test metadata includes identifying source code portions that indicate conditions for rejecting or accepting packets and determining the test metadata based on the conditions, wherein analyzing the one or more source code files to determine the test metadata includes generating, using the one or more source code files, a parse data structure indicating processing states for a protocol parser; traversing a path of the parse data structure to identify a sequence of packet headers indicative of valid packets; and generating, using the sequence of packet headers, a test plan that defines valid test traffic for testing the network node;

generating, using the test metadata, one or more test plans for testing the network node, wherein the one or more test plans define test packets to be sent to the network node for testing the network node's implementation of the conditions for rejecting or accepting packets; and testing the network node using the one or more test plans.

* * * * *